Oct. 17, 1939.　　A. J. LIPPOLD　　2,176,557
BOTTLE FILLING APPARATUS
Filed Nov. 15, 1937　　5 Sheets-Sheet 1

Fig. 1.

INVENTOR
ADOLPH J. LIPPOLD
BY
Wheeler, Wheeler + Wheeler
ATTORNEYS

Oct. 17, 1939.    A. J. LIPPOLD    2,176,557
BOTTLE FILLING APPARATUS
Filed Nov. 15, 1937    5 Sheets-Sheet 2

Fig. 2.

INVENTOR
ADOLPH J. LIPPOLD
BY
Wheeler, Wheeler & Wheeler
ATTORNEYS

Oct. 17, 1939.　　A. J. LIPPOLD　　2,176,557
BOTTLE FILLING APPARATUS
Filed Nov. 15, 1937　　5 Sheets-Sheet 3

INVENTOR
ADOLPH J. LIPPOLD
BY
Wheeler, Wheeler, + Wheeler
ATTORNEYS

Oct. 17, 1939.   A. J. LIPPOLD   2,176,557
BOTTLE FILLING APPARATUS
Filed Nov. 15, 1937   5 Sheets-Sheet 4

INVENTOR
ADOLPH J. LIPPOLD
BY
Wheeler, Wheeler + Wheeler
ATTORNEYS

Oct. 17, 1939.　　　A. J. LIPPOLD　　　2,176,557.
BOTTLE FILLING APPARATUS
Filed Nov. 15, 1937　　　5 Sheets-Sheet 5

INVENTOR
ADOLPH. J. LIPPOLD
BY
Wheeler, Wheeler & Wheeler
ATTORNEYS

Patented Oct. 17, 1939

2,176,557

UNITED STATES PATENT OFFICE 2,176,557

BOTTLE FILLING APPARATUS

Adolph J. Lippold, Milwaukee, Wis., assignor to Cherry-Burrell Corporation, Chicago, Ill., a corporation of Delaware Application November 15, 1937, Serial No. 174,582

54 Claims. (Cl. 226—76)

This invention relates to improvements in bottle filling apparatus.

Broadly stated, it is one of the primary objects of the invention to provide a novel and simplified bottle filling apparatus readily adjustable for handling bottles of differing sizes and employing a single star wheel and a single feed and discharge table for compactly and inexpensively loading and unloading the bottle filling turntable and capping table.

More specifically, the invention has a number of objects, many of which will appear in the following disclosure. Others may be stated briefly as follows:

It is the specific object of the invention to provide a compact inexpensive bottle filling apparatus in which a single continuously operable table adjacent the bottle filling turntable serves both as feed and unloading table either for a hand loaded or automatic machine.

It is my further object to provide an arrangement of guides over this single feeding and unloading table to enable portions of the surface of the table to be utilized for the storage of full and capped bottles to facilitate the work of the operator where the machine is hand loaded.

It is my further purpose to enable a single intermittently operable star wheel to transfer the bottles to and from his continuously moving feed and unloading table and to and from the turntable, the intermittent movement of the star wheel providing a dwell which permits the bottles successively to rest beneath the capper during the capping operation. In this connection it is my further purpose to provide in association with the star wheel transfer tables oppositely inclined at their respective opposite ends to have a very slight upward inclination in the direction of bottle movement along the loading and unloading paths, whereby to avoid any possibility of jamming bottles.

Another specific object of the invention is to provide gates or guides adjustably mounted at each side of the star wheel contiguous to the paths of movement of the loading and unloading bottles and to make such gates simultaneously adjustable while at the same time providing for the ready assembly and initial adjustment of the machine by the provision of a datum adjustment from which all subsequent manipulations of the machine by the operator take place.

Other objects of the invention relate to the accurate positioning of the bottles; first, in the star wheel in the course of the loading operation; secondly, with reference to the lifting elevators on the turn table; third, with reference to the star wheel again; and finally, with reference to the capper. It is my further purpose to provide adjustable bottle positioning means on the turntable by means of which separate positioning devices for each bottle elevator are connected for concurrent adjustment according to the size of bottle upon which the machine is to operate.

Another object of the invention is to provide means whereby the machine is almost entirely assembled of standard parts which may be inverted or otherwise interchanged at the time of assembly to adapt the machine either for right hand or left hand operation. Any machine embodying this invention may, at any time, be converted from a right hand machine to a left hand machine or vice versa without interfering with any of the adjustment functions or bottle positioning functions already described.

In the drawings.

Like parts are identified by the same reference characters throughout the several views.

A machine of this character may conveniently be assembled upon a base or frame 10 which is of generally triangular form in plan supported on legs 11 at its corners.

Above the smaller or apex end of the frame 10 is a disk 15 comprising a feeding and unloading table. A suitable bearing at 16 guides a shaft 17 connected with disk or table 15 for the rotation thereof. In the particular assembly of the parts illustrated in Fig. 1 the direction of rotation is clockwise.

Figure 1:
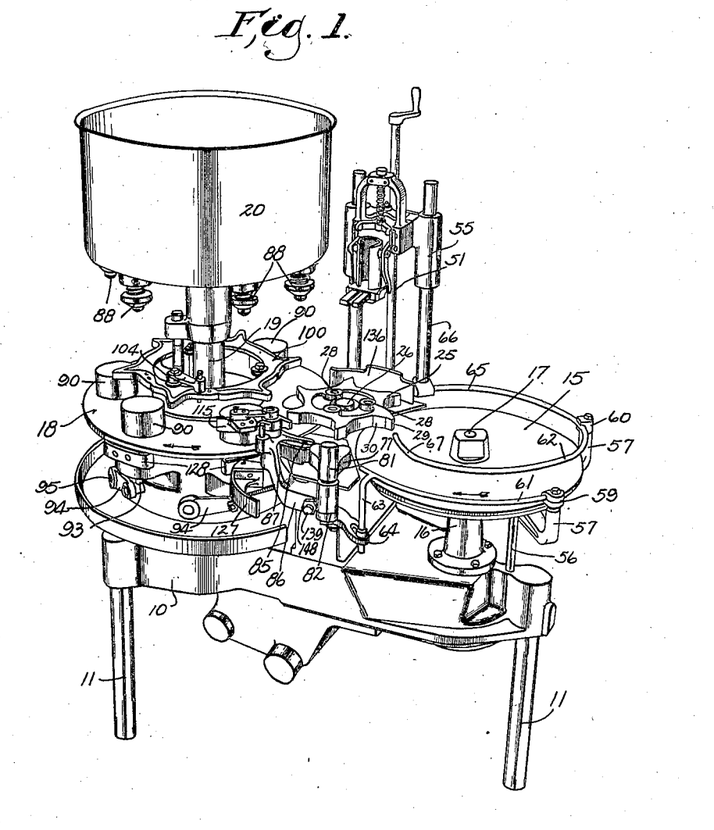
Figure 1 is a view of the machine in perspective.
Figure 2:
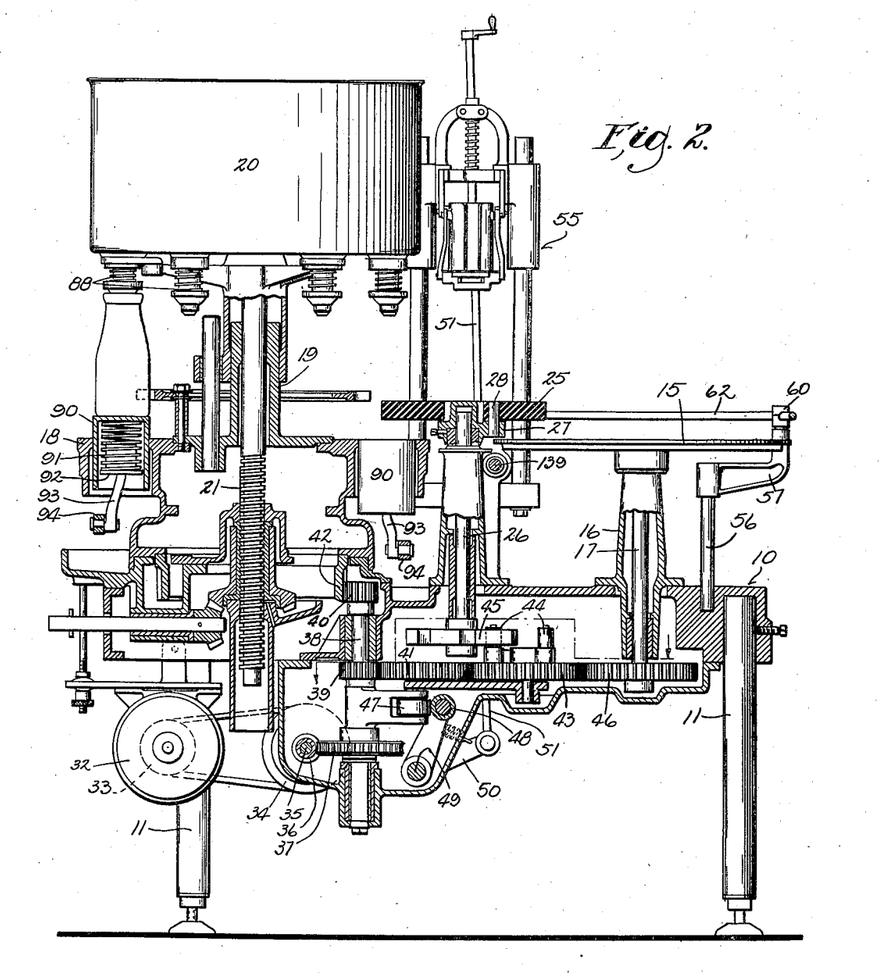
Figure 2 is a view of the machine in longitudinal vertical section.

Above the broader end of the triangular base or frame 10 is the rotatable turntable 18 upon which the standard 19 supports the milk reservoir 20 in conventional manner. The turntable and reservoir are driven as a unit by shaft 21 and the direction of rotation, as the parts are assembled in Fig. 1, is clockwise. Rotative movement is imparted to the turntable unit by a suitable shaft 21.

Between the table 15 and the turntable 18 is the star wheel 25 mounted on shaft 26 which is in a common plane with shafts 17 and 21. This shaft 26 carries a spider 27 provided with three pins 28 receivable through corresponding apertures in the star wheel 25 to enable the star wheel to be inverted when the direction of rotation of the shaft 26 is changed. In the device as illustrated in Fig. 1, shaft 26, like shafts 17 and 21, is set to operate clockwise. The several fingers 29 of the star wheel are each so formed as to provide in advance of the finger a bottle receiving pocket 30. The purpose of inverting the star wheel when the direction of rotation of shaft 26 is changed is to maintain such pockets, at all times, in advance of the fingers 29 in the direction of star wheel rotation. The star wheel (or at least its fingers) is preferably made of non-metallic and at least slightly yieldable material to reduce noise and breakage. A fairly well vulcanized rubber is preferred but fiber and composition materials may be used.

Shafts 17 and 21 operate continuously. Shaft 26 is intermittently operated. The actuating connections will now be described.

The motor 32 is provided with a variable speed pulley 33 belt connected with pulley 34 on the worm shaft 35. Worm 36 drives the worm gear 37 on a vertical shaft 38 which carries pinions 39 and 40 meshing with gears 41 and 42 respectively. Gear 42 is mounted directly on the turntable shaft 21. Gear 41 is an idler meshing with gear 43 which carries a suitable number (three in this case) of feed rollers 44 coacting with the slotted wheel 45 on star wheel shaft 26 to comprise a Geneva motion for the intermittent rotative advance of the star wheel 25. Wheel 45 may be inverted for the conversion of the device to a right hand machine.

Gear 43 also meshes with gear 46 on the shaft 17 which carries the feed and discharge table 15.

Figure 8:
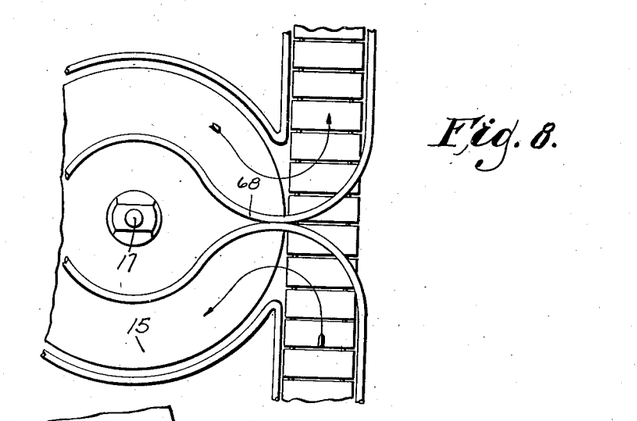
Figure 8 is a detail view in plan showing a modified arrangement for the conveyor loading and unloading of the feed and discharge table.
Figure 9:
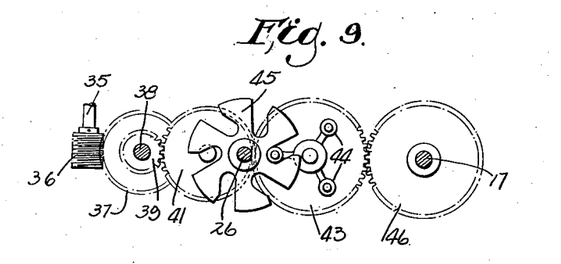
Figure 9 is a detail view taken on the line 9—9 of Figure 2.

For the actuation of the capping mechanism I provide on a vertical shaft 38 a cam 47 coacting with the cam follower roller 48 on an arm of rock shaft 49. Another arm 50 of such rock shaft carries a link 51 connecting it with any desired capper mechanism such as is generically illustrated at 55. The capper mechanism may be the mechanism shown in United States Letters Patents Nos. 1,221,105 or 1,779,683. Adjacent the apex end of the frame 10, beyond the bearing support 16 for the infeed table 15, I provide a post 56 having arms 57 extending upwardly adjacent spaced points on the periphery of the table 15. The head portions 59 and 60 of the respective arms comprise clamps for the bottle guide members 61 and 62 respectively. Guide member 61 is arranged to extend circumferentially of the table immediately above the edge thereof. Its remote end is supported by a standard 63 adjustably mounted in bracket 64. The guide 62 is helical and the clamping head 60 engages it intermediate its ends. One of its ends 65 is connected with the capper post 66. Its other end 67 is free and has helically approached the axis of shaft 17 sufficiently so that the bottles discharged on to the table 15 within the guide 62 will be held out of the path of the incoming bottles fed between the two guides 61 and 62. The guide 62 encloses a portion of the periphery of table 15 which is devoted to temporary bottle storage and upon which the filled bottles may be allowed to remain temporarily until the operator can remove them. These guides may be entirely replaced by a small wedge-shaped guide 68 projecting from a point above table 15 over a transverse input and output conveyor to act as a divider to make the loading and unloading of the table 15 entirely automatic if desired. This arrangement is shown in Fig. 8.

As above indicated, the incoming empty bottles are fed on to the disk 15 adjacent the periphery thereof between guides 61 and 62. The table moves continuously and as the star wheel 25 intermittently advances in its step by step movement, the rotation of each of the fingers 29 in partial opposition to the path of bottle advance on table 15 will remove from the table the foremost empty bottle thereon, the subsequent dwell of the star wheel presenting another pocket 30 into which a successive empty bottle will move. The face of table 15 is smooth so that when the bottles are brought to rest the table will slip beneath them.

Figures 5, 7:
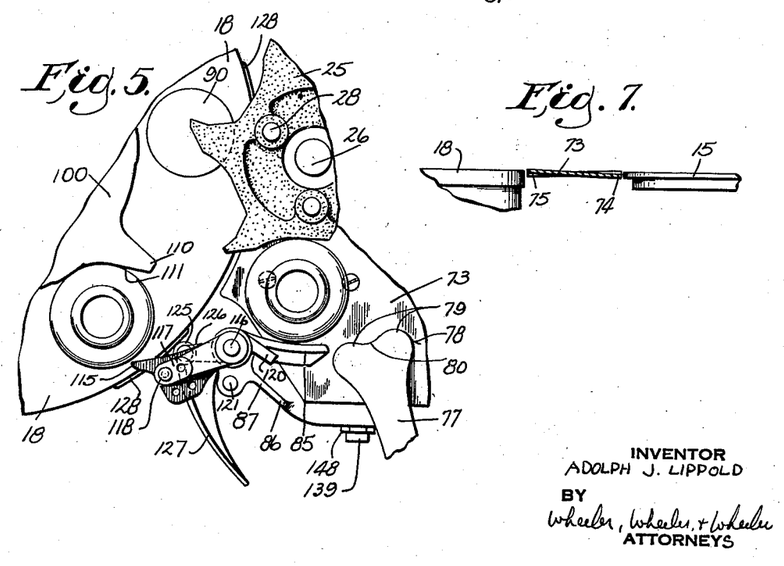
Figure 5 is a detail view similar to Figure 4 showing a further advance of portions of the bottle handling mechanism.
Figure 7 is a diagrammatic view showing the bottle handling tables in cross section.
Figure 6:
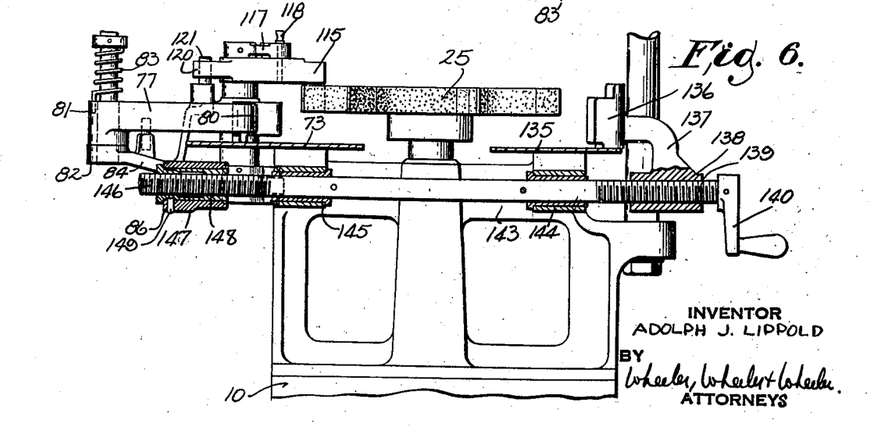
Figure 6 is a view taken partially in cross section on the line 6—6 of Figure 4.

Between the table 15 and, the turntable 18 I provide a transfer table 73 which, as shown in Fig. 7, is preferably set at a very slight upward inclination in the direction of bottle movement. The margin 74 of the transfer table which lies adjacent table 15 is slightly below the level of such table, while the delivery margin 75 of the transfer table is slightly above the level of the adjacent surface of the turntable 18. This makes it virtually impossible for the bottom of any bottle to stick in spanning the gap between tables.

In view of the fact that the initial movement of the star wheel, following lodgment of an empty bottle into pocket 30, is in a direction opposed to the movement of peripheral portions of turntable 15, there will be a tendency for the friction of the feed table 15 to seat the bottle deep in pocket 30. In the event, however, that the bottle should tend to move out toward the end of the propelling finger 29 of the star wheel, I provide at 77 a gate member having a heart-shaped head at 78 comprising two projections 79 and an intervening hollow at 80. The gate member 77 is mounted on a tubular support 81 which is acted upon by a superimposed torsion spring 83 normally urging the gate member clockwise about its supporting standard 82 to the position shown in Fig. 1. The gate member is, however, yieldable against the torsion of the spring 83 from the position shown in Fig. 1 if struck by a bottle.

The radial length of the gate member 77 from the tubular support 81 is such that it is normally out of the path of a bottle properly seated in the appropriate star wheel pocket 30, but if a bottle is too far out of its pocket along the propelling finger 29 of the star wheel the bottle will encounter the gate member 78 and the gate member, as it yields, will have a component of movement such as to move somewhat faster than the star wheel and thereby to roll the bottle inwardly toward its pocket 30 to ensure the movement of the bottle within the relatively fixed guide member 85, about the inner periphery of which the bottle travels.

As soon as the bottle is properly seated in the pocket it will clear even the projecting portions 79 of gate member 77, and the torsion spring will return member 77 to its original position as illustrated.

The standard 82 which supports the gate member is mounted on the arm 84 of bracket 86. This bracket has another arm 87 which extends upwardly adjacent the turntable 18 and carries the relatively fixed guide member 85. The guide member 85 extends arcuately about the axis of the star wheel shaft 26, being substantially concentric with the star wheel. It terminates just over the edge of the turntable 18, so as to be out of the path of a bottle moving with and upon the turntable. An extension guide means is provided for positioning the bottles on the turntable and there is mechanism for moving such extension guide means out of the path of the bottles as the turntable advances. Before describing this I shall first refer briefly to the turntable construction.

The reservoir 20 is provided at 88 with conventional valved filler heads for delivering milk from the reservoir to a bottle pushed against such heads. To raise the bottles to the heads the turntable is equipped, also in a conventional manner, with elevators 90 in the form of cylindrical plungers movable vertically through the turntable 18. Each such elevator is yieldably supported by a spring 91 from the head 92 of a connecting rod 93 which is lifted by the crank element 94 of a rock shaft 95 when a cam follower (not shown) carried by such rock shaft within the turntable encounters a stationary lifting cam (not shown) about which the turntable revolves. This arrangement follows general practice and need not be described in detail. It is sufficient to note that the top of each elevator is substantially flush with the turntable at the time bottles are supplied to the turntable and discharged therefrom adjacent star wheel 25. As soon as a bottle is properly positioned on its elevator the elevator is raised to bring the bottle into contact with the filling head 88 to initiate the flow of milk into the bottle and the bottle remains in its raised position in engagement with the filling head 88 until its circuit about the turntable is almost completed, at which time the bottle is lowered in preparation for its discharge.

Means for positioning bottles on the elevator is, in some manner, carried by the turntable to rotate therewith. The elevators 90 need not, of themselves, include any bottle positioning means. The top of each is preferably entirely flat to facilitate the movement of bottles on to and off from the elevators. In order to assist in accurately centering each bottle on its elevator, I provide a positioning ring 100 having a circular inner peripheral portion 101 rotatable upon the roller guides 102 which are carried by studs 103 mounted at suitable intervals on the turntable. On the top of the stud 103' is pivoted a positioning link 104 provided at its end with a pin 105 engageable alternatively with any one of a series of openings 106, 107 in the ring 100. By rotating the ring and engaging the positioning pin 105 in a different aperture the ring is readily adjusted to accommodate different bottle sizes and to position the bottles of each size accurately on the elevators. This single adjustment takes care simultaneously of the positioning means for all elevators.

Figure 4:
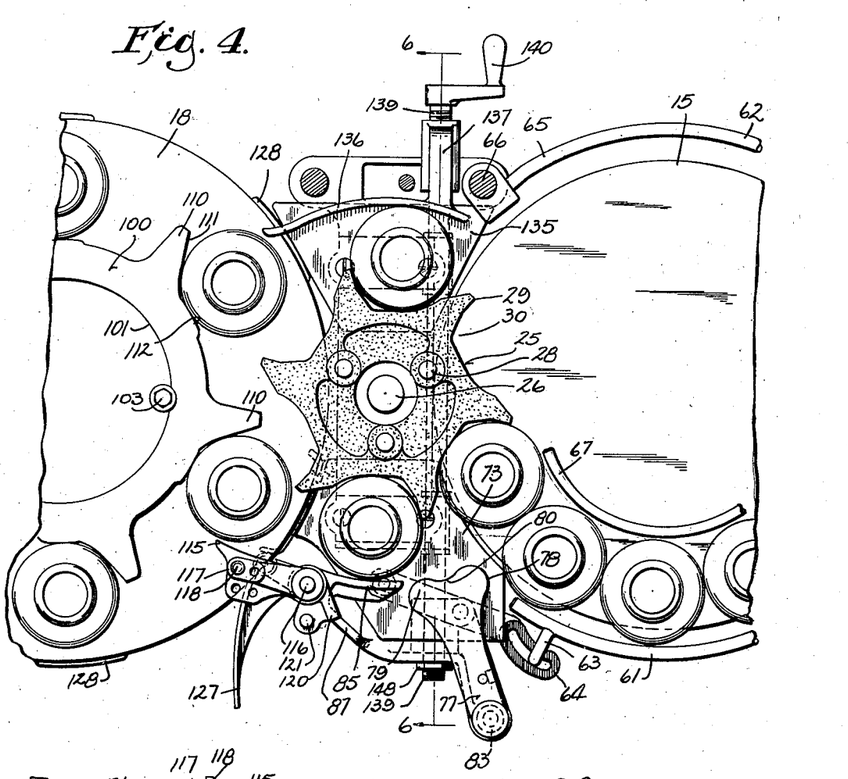
Figure 4 is an enlarged fragmentary detail view in plan of the bottle actuating and carrying portions of the mechanism showing portions of the mechanism somewhat advanced from their Figure 3 positions.

The positioning ring 100 is somewhat similar to the star wheel in that its outer periphery includes projecting fingers of the peculiar form illustrated in Fig. 4 of the drawings. Each of the bottle positioning fingers 110 is provided on its forward face 111 with a bearing surface continued at an obtuse angle to the peripheral portion 112 of the ring 100. For clockwise rotation as viewed in Fig. 4 the ring is positioned as shown in that view. For counterclockwise rotation the ring may readily be inverted without any change in its operation or function.

Figure 3:
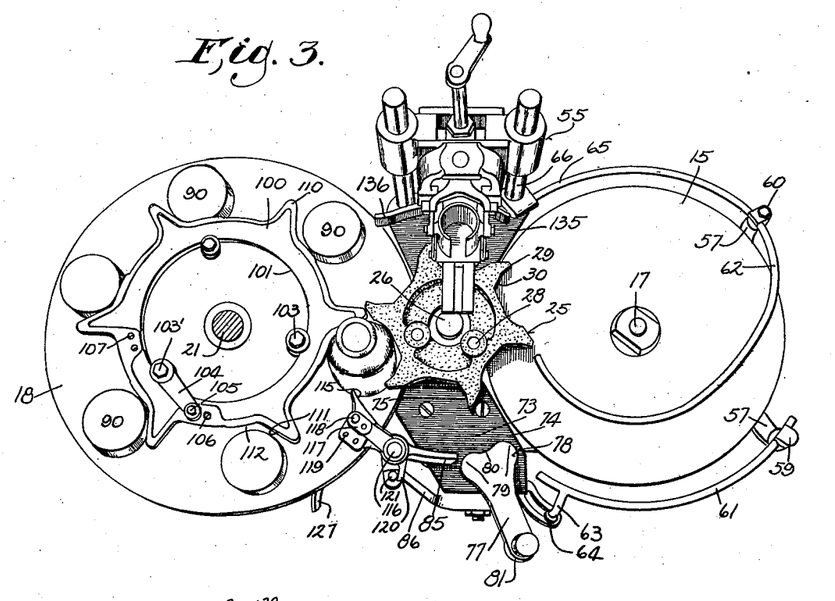
Figure 3 is a view in perspective of the bottle carrying portions of the machine, the filler mechanism being broken away.

As clearly appears from Fig. 3 the star wheel 25 tends to deliver the bottle into the angle between bearing surfaces 111 and 112. The adjacent peripheral portions of the star wheel and the turntable are moving in opposite directions, but whereas the turntable movement is continuous, that of the star wheel is only intermittent. During the dwell of the star wheel the turntable will remove the bottle from the star wheel pocket as shown in Fig. 4.

To co-operate in the proper positioning of the bottle on the elevator 90 I employ the extension guide above referred to. In Figs. 3, 4, and 5 of the drawings this guide has an arcuate arm 115 pivoted on the oscillatory shaft 116 carried by bracket arm 87. Fixed to the upper end of the shaft and overlying the arcuate guide member 115 is a lever 117 adjustably connected by means of screws 118 to the guide arm 115, such guide arm being provided at suitable points with threaded apertures 119 to receive the screws. The lever 117 is extended beyond shaft 116 at 120 to engage a stop peg 121 carried by bracket arm 87 to limit the oscillation of shaft 116, arm 117, and guide member 115 in a clockwise direction as viewed in Fig. 4.

At its lower end the shaft 116 carries the cam follower arm 126 which projects toward the turntable and is provided with a cam follower roller 125 and with a tail-like cam follower extension 127. Both the roller and the extension 127 are arranged to coact with cams 128 fixed at suitable intervals to the turntable in association with each of the elevators 90 thereon.

The arrangement is such that after the guide 115 and the rotation of star wheel 25 have positioned a bottle on one of the elevators 90, the extension guide member 115 must immediately be removed from the path of the bottle as it advances on the turntable. This is done by engagement of the turntable cam 128 with the roller 125 to oscillate the shaft 116 in a counter-clockwise direction as viewed in Fig. 4 at a rate somewhat faster than the rate of turntable advance so that the extension guide member 115 is free of the bottle as shown in Fig. 5.

As soon as the bottle clears the path of movement of the extension guide, the guide must be returned to control and direct the movement of the next bottle advanced by the star wheel on to the turntable. The bottle will already be partially on the turntable at the time the extension guide is returning. The return movement of the extension guide is effected by means of a spring (not shown) to the point determined by engagement of the lever extension 120 with the stop 121. To prevent too sharp an impact between the extension guide 115 and the next bottle to be acted on thereby, the shape of the cam follower tail piece 127 is such that in passing rearwardly over the cam 128 it will only allow the return of the rock shaft 116 and the guide extension 115 at a moderate speed.

Figure 10:
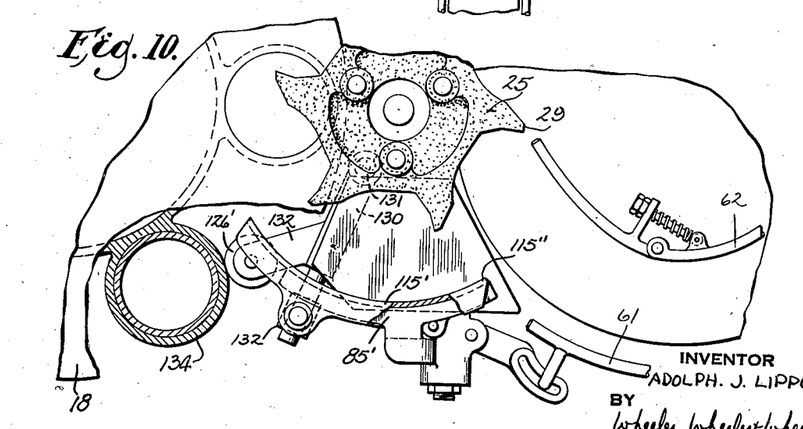
Figure 10 is a detail view showing a modified form of guide.

A somewhat simpler construction may be used if desired and is illustrated in the modified embodiment shown in Fig. 10. In this construction the extension guide member comprises a channel 115' which is arranged to yield arcuately along the stationary guide member 85'. The channel is supported on an arm 130 pivoted at 131 and having a yieldable extension piece 132 carrying the channeled member 115' to compensate for the difference in arc between the center of the star wheel and the fulcrum point 131.

A branch arm 132 carries the cam follower roller 126' which is so positioned that it can ride on the elevator pockets 134 as cams to cause at the appropriate time the telescopic retraction of the extension guide 115' from the path of the next succeeding bottle on the turntable.

In this construction the remote end 115'' of the extension guide member 115' is positioned to pass between successive bottles on the feed table so that as the star wheel advances the next successive bottle from the feed table the bottle will move with the extension guide 115' until such guide comes to rest, after which the bottle will proceed on to the turntable as above described.

This arrangement makes unnecessary the cam follower tail pieces 127 of the construction previously described.

In either case the relation of the star wheel fingers 29 and the extension guide member 115 to the bottle and to the fingers 110 of the positioning ring 100 is interesting. In the preferred arrangement the bottle is delivered on to the elevator 90 into contact with the bearing surface 111 of the positioning ring finger 110. The bearing surface 111 is a substantially rectilinear surface (or at least not curved as much as the bottle) and consequently it will contact the wall of the bottle at a point only. The layout of the parts is such that a line drawn from said point of contact to the tip of the star wheel finger 29 which is propelling the bottle will not pass through the center of the bottle but will be drawn upon a minor chord thereof. Consequently the resultant of any line of pressure between the star wheel and the positioning ring will tend to expel the bottle in the very direction in which it must advance in the movement of the turntable. Thus any tendency of the mechanism to crush the bottle is avoided and the movement of the bottle is natural and free of stress or shock.

The extension guide member 115 has its tip engaged with the wall of the bottle at a point which is at the opposite side of the bottle diameter from the point of the bottle engaged by the star wheel finger 29. In other words, a line drawn from the tip of the guide extension 115 to the point of contact of the bottle with bearing surface 111 will likewise be on a minor chord of the bottle at the other side of the center from the minor chord previously referred to.

Thus in the positioning of the bottle on the elevator it will be engaged at three spaced points of its periphery to accurately determine its position.

The entire guide mechanism mounted on bracket 86 is adjustable through means hereinafter to be described, but in addition to such adjustment it is desirable to render the turntable cams 128 effective on the cam follower roller 125 at different points of turntable travel when bottles of different size are to be accommodated. This adjustment is made by means of the screws 118 already described which enable the oscillatory shaft 116 and the arm 117 thereof to be fixed at different angular positions with respect to the guide extension arm 115 and the stop members 120 and 121.

After the bottle has been filled in its rotation with the turntable, its elevator will be lowered as the bottle again approaches the star wheel 25. The star wheel will be at rest, during one of its dwell periods, as the bottle contacts its finger 29. Immediately the star wheel will be set in motion and will advance angularly for the distance between two successive teeth or fingers 29, thus sweeping the full bottle from the continuously advancing turntable across the transfer table 135.

The contact of the star wheel finger with the bottle is effected at such a point that a line drawn from that point to the point of bottle engagement with the surface 111 of the positioning ring will be on a minor chord of the bottle behind the center with reference to the direction of bottle expulsion from the turntable. Whereas transfer table 73 on the infeed side of the apparatus was inclined slightly in the direction of bottle advance, so transfer table 135 is preferably slightly inclined, its pitch being opposite to that of table 73 for the reason that the direction of bottle movement is opposite. A fixed guide member 136 is located substantially concentric to the star wheel over transfer table 135 as a means of guiding the bottle beneath the capper mechanism generically designated by reference character 55. The point at which the star wheel comes to rest will determine the centering of the bottle beneath the capper in readiness to receive its cap.

The guide member 136 of the capper is carried on arm 137 from a threaded sleeve or nut 138 having an adjusting screw 139. The portion of the screw engaged by the threaded sleeve or nut 138 has a right hand thread. A suitable crank 140 provides for its manipulation.

The screw 139 is provided in housing 143 with bearings at 144 and 145 in which it is fixed against axial displacement. At the other side of the machine the adjusting screw 139 is provided at 146 with a left hand thread. The bracket 86 has a sleeve 147 fitting loosely over the threaded end 146 of the adjusting screw, and an independently adjustable nut 148 with a left hand thread is threaded to the adjusting screw and releasably pinned by the screw 149 to the bracket 86. This arrangement enables an initial or datum adjustment of the bracket 86 to be made with reference to the guide 136. After the initial adjustment of the parts has been made by the independent rotation of screw 148 to the correct position, the nut 148 is then locked to the bracket 86 and thereafter the bracket will move with the nut so that the guides at both the input and discharge sides of the machine may be simultaneously adjusted for different bottle sizes.

At the discharge side of the machine the guide element 136 is the only one which requires adjustment.

At the input side of the machine the guide rod 61 over the disk 15, the oscillatory gate member 77, the relatively fixed guide 85, the guide extension lever 115, the oscillatory shaft 116, the cam follower arm 125 and roller 126, and all mechanisms related to these parts, are all mounted on the bracket 86 to move with the bracket under the control of the nut 148 as above described.

After the bottle has been capped in a position determined by the star wheel finger 29 and the adjustable guide 136, the next successive advance of the star wheel will deliver the bottle on to the rotating disk 15. Such disk will advance the bottle until it is removed from the disk by the operator. As above noted, a very substantial storage space on the face of the disk is provided within the helical guide rod 62.

Where it is desired to change the machine from a left hand to a right hand machine, it is only necessary to invert the star wheel 25 and the guide ring 100 on the turntable and to remove the casing 143 which extends transversely of the machine and carries the star wheel shaft and the adjusting screw 139. The guide parts at the input side of the machine will have to be replaced, but this can be done by unitarily substituting a new casing at 143 on which input guide parts appropriate for a right hand machine have already been mounted. Thus, for the most part, the same identical machine elements are used throughout for right hand and left hand operation, being simply inverted or changed in assembly according to the direction of operation desired. The direction of motor rotation will then be chosen accordingly and very few parts must be supplied specially for a particular direction of rotation.

The adjustment of the machine to handle different sizes of bottles may be accomplished with the utmost facility. All of the major adjustments are made by simply turning the crank 140. If the construction shown in Fig. 1 is employed there is another adjustment to be made in connection with the extension guide which assists in positioning the bottles on the turntable.

Thus I have provided a very simple, relatively inexpensive and compact machine due to the particular guide mechanism employed and, more especially, to the organization whereby the star wheel shaft is located in a common plane with the continuously operating shafts of the feed disk and turntable, the arrangement being such that the single star wheel loads the bottles on to the turntable from the feed disk and discharges the bottles from the turntable on to the feed disk.

I claim:

1. In a bottle filler, the combination with a turntable provided with bottle filling mechanism, of a rotatable feed table adjacent the turntable and having a disk-like supporting surface for the frictional advance of bottles resting thereon, and a single star wheel for loading and unloading the turntable, said star wheel being disposed between the feed table and the turntable to receive bottles from the feed table and to return bottles to the feed table, the surface of the feed table constituting a storage space upon which such returned bottles may accumulate pending their removal.

2. In a bottle filler, the combination with a turntable provided with bottle filling means, of an adjacent rotatable feed table, means for the continuous rotation of said table, a single star wheel positioned between said turntable and feed table and having integral bottle propelling arms and provided with associated mechanism for the loading and unloading of the turntable and for receiving bottles from and discharging filled bottles on said feed table, means for rotating said turntable, star wheel, and feed table upon their respective axes, and means supporting said turntable, star wheel and feed table with their several axes in a common plane.

3. A bottle filling machine comprising the combination with a turntable and means for filling bottles thereon, of an adjacent rotatable feed and discharge table, intervening transfer tables and a star wheel disposed between said turntable and feed table and having fingers rotatable upon a path overlying all of said tables, guide means extending across said transfer tables and adapted to cooperate with the fingers of said star wheel for delivering empty bottles from the feed table to the turntable and for delivering filled bottles from the turntable back to the feed table, and means for rotating said turntable and feed table upon their respective axes, together with means for supporting said turntable, star wheel and feed table with their several axes in a common plane, said feed and discharge table having a smooth bottle supporting surface constituting a frictional bottle propelling means upon which bottles may accumulate for temporary storage.

4. A bottle filling machine comprising the combination with a turntable and means for filling bottles thereon, of an adjacent rotatable feed and discharge table, intervening transfer tables and a star wheel disposed between said turntable and feed table and having fingers rotatable upon a path overlying all of said tables, guide means extending across said transfer tables and adapted to cooperate with the fingers of said star wheel for delivering empty bottles from the feed table to the turntable and for delivering filled bottles from the turntable back to the feed table, means for rotating said turntable and feed table upon their respective axes together with means for supporting said turntable, star wheel and feed table with their several axes in a common plane, and guide means extending about said feed table from substantially the point of discharge of filled bottles thereon and thence extending helically at decreasing radius whereby to store filled bottles on the surface of the rotating feed table pending their removal.

5. In a bottle filling machine, the combination with a turntable and means for filling bottles thereon, of means for propelling empty bottles to said turntable and full bottles from said turntable, and a transfer support adjacent said turntable in the path of said bottles, said support including portions upwardly inclined in the direction of bottle movement, the discharge portion of said support in the path of the infeed bottles being slightly higher than said turntable and the receiving portion of said support in the path of discharged bottles being slightly lower than said turntable.

6. A bottle filling machine comprising the combination with a turntable and bottle filling mechanism mounted thereon, of a feed table adjacent said turntable, star wheel means comprising a hub and fingers thereon structurally integral with the hub for propelling bottles from said feed table toward said turntable, said star wheel means being also adapted to receive full bottles from said turntable and to propel them over said feed table, a capper disposed in the path upon which full bottles are propelled by said star wheel, and means for actuating said capper in synchronism with the movement of said bottles.

7. In a bottle filling machine, the combination with a turntable provided with bottle filling mechanism, of a capper, means for the intermittent actuation of the capper, means for the continuous operation of the turntable, an intermittently operable, rotary feeder for delivering bottles to the turntable and for delivering bottles to the capper, and means for rotating said feeder in synchronism with the actuation of said capper to provide a dwell during the capper operation and in synchronism with the operation of the turntable, said feeder comprising a member having structurally integral arms fixed thereto to be stationary during the dwell of the feeder, said turntable being provided with means for receiving bottles from said feeder during said dwell.

8. In a bottle filling mechanism, the combination with a turntable provided with bottle filling means, of an adjacent rotatable feed and discharge table, means for rotating said turntable and said feed and discharge table, transfer table means disposed between said turntable and said feed and discharge table, a single feeder for propelling both filled and empty bottles across said transfer table means between said turntable and said feed and discharge table, a capper positioned above the path of movement of filled bottles across said transfer table means, and mechanism for operating said capper and said feeder in synchronism for the capping of bottles enroute between said turntable and said feed and discharge table.

9. In a bottle filling machine, the combination with a turntable provided with bottle elevators and bottle filling means, of a bottle feeder for loading and unloading said turntable, said feeder comprising bottle propelling fingers structurally integral with hub means supporting said fingers for movement in a path at least partially overlying the path of movement of the bottle elevators on said turntable, and means for actuating said bottle feeder in a direction such that the movement of said fingers over said elevators is opposite to the direction of movement of the elevators on the turntable, said actuating means comprising intermittently operable driving connections provided with synchronized connections for the actuation of said turntable, whereby to provide a dwell of said actuating means during the movement of bottles on said elevators out of the engagement of said fingers.

10. In a bottle filling machine, the combination with a turntable provided with bottle pedestals and bottle filling means, of means for rotating the turntable, a single bottle feeding means for loading empty bottles upon the pedestals and removing filled bottles therefrom, said feeding means comprising a star wheel having fingers structurally integral with a supporting hub means and movable across the path of movement of the turntable pedestals, mechanism for the intermittent driving of said star wheel in synchronism with the movement of said turntable to provide a dwell for the movement of bottles on successive pedestals out of engagement by the star wheel during the star wheel dwell, and means disposed in the path of filled bottles discharged by said star wheel from said turntable for capping such bottles during the periods of star wheel dwell.

11. In a bottle filler, the combination with a turntable provided with bottle pedestals and filling means, of a feeder comprising a feed table and a star wheel having bottle propelling fingers rotatable over said feed table and across the path of said pedestals, a positioning ring carried by the turntable having bottle positioning arms lying behind the respective pedestals, and guide means retractible from said pedestals in the course of turntable advance, said ring, the arms thereof, said guide means and said star wheel fingers together constituting bottle positioning parts spaced to engage each bottle at least at three points spaced about its periphery for the positioning thereof on the pedestal during turntable movement.

12. In a bottle filler, the combination with a turntable provided with bottle supports and bottle filling means, of a single positioning device adjustably mounted on the turntable and provided with bottle positioning arms projecting behind each of the several bottle supports to assist in positioning bottles of different sizes upon said supports according to the adjustment of said positioning device respecting the turntable, cooperating means for positioning bottles upon the respective supports, said cooperating means comprising a star wheel feeder having fixed bottle engaging arms, means for intermittently advancing said star wheel feeder and intermittently occasioning a dwell thereof, the direction of projection of said arms being such that at the moment of dwell each arm will be substantially tangent to the position of a bottle properly fixed upon its turntable support, a separate guide positioned to engage said bottle in opposition to the direction of its movement on the turntable and at a point spaced peripherally of the bottle between the arm of the positioning device and the arm of the star wheel, and means for retracting said guide from the path of advance of a bottle properly positioned upon its respective support.

13. A bottle filling machine comprising the combination with a turntable provided with bottle filling means and bottle supports, of a single star wheel feeder for empty and filled bottles moving to and from said turntable supports, guide means associated with opposite sides of said feeder for guiding empty and filled bottles respectively, adjustable supports for the respective guide means, one of said guide means being adjustable on its support in addition to its adjustment with its support, and mechanism for the concurrent adjustment of said supports to and from each other for accommodating different sizes of bottles, said mechanism being provided with means for the adjustment of the moving guide means radially to and from the star wheel to supplement the adjustment of said supports.

14. A bottle filling machine comprising the combination with a turntable provided with bottle filling means, of a single feeder for empty and filled bottles moving to and from said turntable, guide means associated with opposite sides of said feeder for guiding empty and filled bottles respectively, adjustable supports for the respective guide means, and mechanism for the concurrent adjustment of said supports, one of said supports being provided with an adjustable connection to said mechanism releasably adapted to permit of the independent movement of said mechanism to relative datum positions of said supports from which said supports are concurrently movable.

15. In a bottle filler, the combination with a turntable provided with bottle supports and filling means, of a bottle positioning means carried by said turntable in association with the respective supports, and a star wheel type bottle feeder including structurally integral arms movable across a portion of said turntable, said positioning means and feeder means having bottle engageable portions so disposed as to contact portions of a bottle on said support on a line constituting a minor chord of said bottle offset from the center thereof in a direction opposite the direction of bottle movement on said support.

16. In a bottle filler, the combination with a turntable provided with bottle supports and filling means, of a bottle positioning means carried by said turntable in association with the respective supports, a bottle feeder including arms movable across a portion of said turntable, said positioning means and feeder means having bottle engageable portions so disposed as to contact portions of a bottle on said support on a line constituting a minor chord of said bottle offset from the center thereof in a direction opposite the direction of bottle movement on said support together with co-operating means for positioning a bottle on said support comprising a guide member temporarily engageable with a bottle on said support at a point toward which the center of said bottle is movable on said support, and mechanism operable in synchronism with said turntable for retracting said guide means out of the path of said bottle in advance of the movement thereof.

17. A bottle filler comprising the combination with a turntable provided with a bottle support, of means engageable with a bottle on said support at three separate points about the periphery thereof, said means being so located that lines connecting said points will lie along minor chords of said bottle, one of said means being mounted on the turntable, another means constituting a bottle feeder, and a third means being yieldably mounted and provided with mechanism operatively connected to be actuated in synchronism with said turntable for retracting said third means.

18. In a bottle filler, the combination with a turntable provided with a bottle support and bottle filling means, of mechanism for actuating the turntable, a bottle positioning member associated with said support, means for delivering a bottle on to said support against said member, a retractible bottle positioning device in the path of bottle movement on said support, and means operatively connected with the turntable for rotation therewith provided with motion transmitting connections to said retractible member for actuating said retractible member out of the path of said bottle.

19. In a bottle filler, the combination with a turntable provided with a support and bottle filling means, of mechanism for propelling a bottle on to said support, means for guiding a bottle in its movement on to said support, said guiding means comprising a retractible member positioned in the path of bottle movement on said support, actuating connections to said member for the retraction thereof, and means carried by said turntable for the operation of said connections in the course of turntable movement.

20. In a bottle filler, the combination with a continuously rotating turntable provided with a bottle support and bottle filling means, of a positioning member to engage a bottle associated with said support and rotatable with said turntable, an unloading mechanism including an arm movable across a portion of said turntable and across at least a part of the path of movement of said support to engage said bottle in said manner, and means for intermittently actuating said unloading mechanism in synchronism with said continuously rotating turntable to cause said arm to remove bottles from said support and said turntable, the points of engagement of said bottle positioning mechanism and said arm with said bottle being substantially restricted to points upon a minor chord thereof at the rear of the center of the bottle with reference to the path of ejection thereof.

21. In a bottle filler, the combination with a continuously rotating turntable provided with a bottle support and filler means, of an adjustable guide member mounted to turn with said turntable adjacent said support for engaging and positioning bottles of differing sizes respecting said support, a star wheel mounted adjacent said turntable and provided with arms movable at least partially across the path of movement of said support to engage said bottles in said manner, and means for intermittently actuating said star wheel in synchronism with said continuously rotating turntable for the coaction of said guide member and a star wheel arm in ejecting a filled bottle from said support and from said turntable, the disposition of said star wheel arm and guide member being such as to effect engagement thereof with the periphery of a supported bottle substantially only at spaced points on the periphery of said bottle on a minor chord thereof such that the resultant component of their action on said bottle will be effective in a direction to promote the expulsion of said bottle.

22. In a device of the character described, the combination with a work conveyor provided with work propelling arms and intervening pockets, of a gate member provided with a fulcrum at a point remote from said conveyor and having a work engaging member extending toward said conveyor out of the path of work fully engaged in said pockets, said work engaging member being yieldable in the direction of work advance upon contact of work therewith and being formed to project work into said pockets in the course of such yielding movement, whereby only work fully engaged in said pockets may be propelled by said conveyor.

23. In a device of the character described, the combination with a star wheel having fingers curved in the direction of star wheel rotation to provide work receiving pockets, a feed gate comprising a member having a heart-shaped head portion spaced from the path of said fingers and an extension pivoted remote from the path of said fingers, and means yieldably holding said gate member in a predetermined position to be engaged by work not fully seated in the respective pockets, said head being adapted to thrust such work into the pockets upon the yielding movement of said member.

24. In a device of the character described, the combination with a transfer table and a rotatable feed table, of a star wheel for receiving bottles from said feed table and advancing such bottles over the transfer table, said star wheel having fingers curved in the direction of peripheral advance of the star wheel to provide bottle receiving pockets, a gate member disposed adjacent the line of demarcation between said feed table and transfer table and provided with a fulcrum remote from said star wheel and a head projecting from said fulcrum toward said star wheel and disposed just outside the path of movement of bottles fully engaged in the respective pockets, and means yieldably opposing the pivotal displacement of said member in the direction of bottle advance, the head of said member being adapted to roll into full engagement in said pockets any bottles engaging said head by reason of their initial displacement from said pockets.

25. In a bottle filler, the combination with a continuously rotating turntable provided with a succession of bottle supports and means for filling bottles thereon, of a single intermittently rotating feeder for delivering empty bottles singly to said supports and for receiving filled bottles singly therefrom, and guide means and actuating connections for the synchronous actuation of said feeder and turntable, said feeder comprising successive pockets each of which is fitted to and adapted to receive only a single bottle from said turntable immediately following the delivery of an empty bottle thereto and each support of said turntable being adapted to receive an empty bottle immediately upon discharge of a filled bottle to said feeder.

26. In a bottle handling machine, a bottle propelling member comprising fingers of non-metallic yieldable material, said fingers having a concave front face relative to the direction of their normal rotation, whereby said concave face will constitute a substantial retaining element to retain materials in a pocket intermediate said fingers and whereby, upon the application of pressure to the end of said fingers or to the opposite side thereof, said fingers will deflect toward said concave face thereby preventing easy entrance to said pocket.

27. In a device of the character described, the combination with a turntable having receptacle supports, of receptacle positioning means carried by the turntable and projecting behind said supports, means for the continuous rotation of the turntable, a feed table adjacent the turntable, a rotatable star wheel having arms movable across the feed table and the turntable in the course of star wheel rotation and projecting from the star wheel to provide receptacle propelling surfaces which, in given star wheel positions, are substantially tangent to the path of movement of a receptacle properly positioned on a turntable support, and means for intermittently rotatively advancing the star wheel, said means including mechanism for producing star wheel dwell at each of the aforesaid positions, whereby a receptacle advanced by the star wheel to the turntable support will be free to move along its respective propelling arm while positioned thereby on its respective turntable support.

28. The combination with a turntable provided with a filler and a receptacle support liftable toward the filler, of means for positioning a receptacle accurately on said support beneath the filler by engagement of the receptacle at least at three points spaced about the periphery of the receptacle to positively determine its position, said means comprising a first member fixed to said turntable and projecting behind the receptacle position on said support, a second member movable toward said position from the side, a third member movable toward said position from the front, the said points of receptacle engagement being so disposed that lines connecting said members at said points will pass at different sides of the center of an engaged receptacle, means for the intermittent advance and dwell of the second member, and a resiliently yieldable mount for the third member.

29. In a bottle filler, the combination with a turntable, of a single star wheel feeder having structurally integral fingers defining pockets intermediate said fingers, a driving shaft for said feeder and driving connections for said shaft including a Geneva wheel having peripherally opening slots inclined with reference to the radius of the wheel, and a co-acting driver having pin means adapted for engagement with said slots, the inclination of said slots from the radius being adapted to prolong the dwell of the feeder and correspondingly accelerate its advancing movement between its periods of dwell.

30. In a filler, the combination with a turntable provided with receptacle supports and filling mechanism, of a single receptacle feeder comprising a star wheel having structurally integral fingers defining pockets intermediate said fingers, a Geneva drive for the star wheel comprising a driven Geneva wheel connected with the star wheel and provided with peripherally opening slots having corresponding forward inclination from the respective radii of said Geneva wheel passing through the points of origin of said slots, and a driving wheel provided with pin means engageable successively in the slots of the Geneva wheel for the intermittent advance and dwell thereof, the forward inclination of such slots being adapted to accelerate the advance and prolong the dwell of the star wheel as compared with the operation of a Geneva wheel having radial slots, said driving wheel having means operatively connecting it for motion with said turntable, whereby said turntable is in continuous operation.

31. In a bottle filler, the combination with a turntable provided with bottle supports and filling mechanism and an adjacent star wheel feeder, of means for the continuous rotation of the turntable and the intermittent rotation and dwell of said feeder, said means comprising a driven gear carried by the turntable, a driving shaft having a first pinion meshing with said gear, a second pinion on the driving shaft, a gear train in operative motion receiving relation to the second pinion, said gear train including a Geneva driver having at least one driving pin, and a driven Geneva wheel slotted to receive said pin and operatively connected with said star wheel.

32. In a bottle filler, the combination with a turntable provided with bottle supports and filling means, of an adjacent star wheel feeder for loading and unloading said turntable, a rotary supply and receiving table for delivering bottles to and receiving bottles from said feeder, of driving connections for said turntable, feeder and last mentioned table, said connections comprising a driven gear connected with the turntable, a drive shaft provided with gear means meshing with said gear for the continuous rotation of the turntable, a pinion on the drive shaft, a gear connected with the supply table, a Geneva wheel connected with the feeder, and a gear train operatively connecting said pinion with the supply table gear, said gear train including a gear provided with at least one pin arranged for operative mesh with said Geneva wheel for the intermittent advance and dwell of said feeder during the continuous operation of the turntable and supply table.

33. A device of the character described, comprising the combination with a bottle feeder having projecting arms and intervening bottle receiving pockets, of a feed gate comprising a lever pivoted remote from the path of movement of said arms and projecting toward said pockets, said gate having a notched head adapted for engagement with a bottle moving toward a pocket of said feeder for seating said bottle firmly in said pocket.

34. A device of the character described, comprising the combination with a bottle feeder having projecting arms and intervening bottle receiving pockets, of a feed gate comprising a lever pivoted remote from the path of movement of said arms and projecting toward said pockets, said gate having a notched head adapted for engagement with a bottle moving toward a pocket of said feeder for seating said bottle firmly in said pocket, said lever being provided with means yieldably urging it in opposition to the path of bottle advance by said feeder.

35. In a device of the character described, the combination with a bottle feeder having bottle propelling arms and intervening pockets, of a feed gate comprising a member having a heart-shaped head portion spaced too closely to the path of said arms to receive a bottle therebetween, said head portion having a central notch co-acting with the pockets of the feeder to position bottles firmly therein, a lever extension connected with said head and pivoted remote from the path of said arms, means providing a stop defining a position of said gate member wherein it is adapted to be engaged by work not fully seated in the respective pockets, and means yieldably urging said gate member about the pivot of said lever toward said predetermined position, said gate member being adapted to thrust into the respective pockets the bottles engaging said gate member in a direction to occasion the yielding thereof about said pivot.

36. The combination with a turntable provided with a filler and a receptacle support, of means propelling a receptacle onto said support and means for assisting in the positioning of the receptacle on the support, said means comprising a finger in the path of receptacle advance on the turntable, and means operatively connected to be actuated in synchronism with the turntable and connected with said finger for the retraction thereof at a rate slightly greater than the rate of receptacle advance after the finger has acted on the receptacle for the positioning thereof.

37. The combination with a turntable provided with a filler and a receptacle support, of a feeder provided with finger means for delivering successive receptacles to said support, means for the intermittent advance and dwell of said feeder, said finger means projecting therefrom at an angle to be substantially tangent to the path of receptacle movement on said support during the dwell of the feeder, means for the continuous operation of the turntable, means cooperating with the feeder finger for positioning the receptacle on the support, said last mentioned means comprising a member connected with the turntable and having a portion located for engagement with a receptacle on the support, and a yieldable finger positioned in the path of the receptacle to be engaged thereby during the advance of the receptacle in the course of turntable movement, said turntable and yieldable member having co-acting cam means for the retraction of said yieldable member from the path of the receptacle following its engagement therewith.

38. The combination with a turntable having bottle supports and a filler, of transfer table means adjacent the turntable, a star wheel feeder for loading and unloading the supports over said transfer table means, a bottle positioning ring rotatably adjustable on the turntable and provided with positioning arms projecting to bottle positions on the respective supports, link means selectively coupling said ring to one of a plurality of predetermined points on said turntable, whereby said arms are adapted to co-operate with bottles of differing sizes, a rotatable mount for said feeder to which said feeder is detachably connected for interchange with feeders for differing bottle sizes, a positioning finger co-operative with the feeder and arms to position bottles on the respective supports, means determining the initial setting of said finger, and means for fixing the adjustment of said finger to engage bottles of differing sizes at said setting.

39. The combination with a rotary member having bottle receiving portions, of impositive means for feeding bottles thereto, a bottle detaining part movable to and from a bottle obstructing position spaced from said rotor in the path of bottles advanced by said means, and driving connections for actuating said part to and from said position in synchronism with the movement of said rotor, whereby to detain subsequent bottles advanced by said means pending the removal of the first bottle by said rotor operation.

40. In a device of the character described, the combination with a turntable, of a loading rotor having bottle receiving portions for delivering bottles to the turntable, a feed table upon which bottles are delivered to said rotor and provided with means for the impositive advance of bottles toward the rotor, and a reciprocatory member of such length as to project alternately over the turntable and feed table, and means for reciprocating said member in synchronism with the operation of the rotor and turntable, said member having at one of its ends bottle positioning means adapted to assist in placing the bottles on the turntable and said member having at the other of its ends a bottle detent positioned to engage bottles advancing on said feed table to restrain them temporarily from contact with the first bottle pending its removal from the feed table by the rotor.

41. In a device of the character described, the combination with a turntable having spaced bottle supports, of an adjacent rotary feed table, a transfer table between the feed table and the turntable, a star wheel having bottle propelling arms adapted to engage the bottles on the feed table and transfer such bottles to the appropriate bottle support of the turntable, means for assisting in the positioning of bottles on the supports of the turntable comprising a reciprocable member having a portion normally disposed in the path of bottle advance with the turntable, means for reciprocating said member out of the path of the advancing bottle carried by the turntable support, and a bottle detent carried by said member remote from the turntable at a point to project over the feed table when said member is reciprocated free of the turntable, said detent being adapted to engage subsequent bottles on the feed table for the detention thereof pending the removal by the star wheel of a bottle engaged by one of said arms.

42. In a device of the character described, the combination with a turntable having spaced bottle supports, of an adjacent rotary feed table, a transfer table between the feed table and the turntable, a star wheel having bottle propelling arms adapted to engage the bottles on the feed table and transfer such bottles to the appropriate bottle support of the turntable, means for assisting in the positoning of bottles on the supports of the turntable comprising a reciprocable member having a portion normally disposed in the path of bottle advance with the turntable, means for reciprocating said member out of the path of the advancing bottle carried by the turntable support, and a bottle detent carried by said member remote from the turntable at a point to project over the feed table when said member is reciprocated free of the turntable, said detent being adapted to engage subsequent bottles on the feed table for the detention thereof pending the removal by the star wheel of a bottle engaged by one of said arms, said detent having a terminal bottle engaging portion yieldable in a direction radially of a bottle squarely encountered thereby.

43. In a bottle filler and capper, in combination, a continuously rotatable turntable provided with bottle filling mechanism and liftable bottle pedestals, a conveying mechanism adjacent the turntable for the frictional advance of bottles toward and the frictional discharge of bottles away from the turntable, a single intermittently rotatable star wheel feed mechanism including structurally integral fingers for transferring empty bottles from said conveying mechanism and loading the same on a pedestal of said turntable and subsequently transferring them back toward said conveying mechanism, an intermittently actuated bottle capper synchronized with said intermittently operable star wheel to cap filled bottles positioned below said capper by said star wheel, and a transfer support adjacent said turntable and intermediate said conveying mechanism and said turnable and in the path of movement of empty bottles toward said turntable, said transfer support including an upwardly inclined portion in the direction of bottle movement in the position at which empty bottles are propelled by said star wheel feed mechanism into position to be received by a pedestal on said turntable, the discharge portion of said upwardly inclined transfer support being slightly higher than the pedestals of said turntable when in bottle receiving position.

44. In a bottle filling machine, in combination, a continuously rotating turntable and means for filling bottles thereon, intermittently vertically reciprocable bottle pedestals carried by said turntable and rotating therewith, means for propelling empty bottles to said bottle pedestals and full bottles from said pedestals, and a transfer support adjacent said turntable in the path of bottle movement, said support including an upwardly inclined portion in the direction of bottle movement at the position at which empty bottles are propelled to said pedestals so that the discharge portion of said support at said position in the path of the infeed bottles is slightly higher than said pedestals when in bottle receiving position and the full bottle receiving portion of said support in the path of discharged bottles being slightly lower than the discharge portion of said support at the point of discharging empty bottles from said support onto said pedestals.

45. In a bottle filling machine, in combination, a continuously rotatable turntable provided with bottle filling mechanism and vertically reciprocable bottle supports, an intermittently operable bottle capper, means for intermittently operating said capper, means for continuously rotating said turntable, means for intermittently reciprocating said bottle supports in vertical direction while the supports rotate continuously with said turntable, and an intermittently operable feeder rotating in a fixed plane for delivering bottles to said bottle supports on said turntable and for delivering bottles to and positioning bottles under said capper, and means for rotating said feeder in synchronism with the operation of said capper to provide a dwell during the capper operation and in synchronism with the operation of said turntable, said feeder comprising a member having structurally integral arms fixed thereto to be stationary during the dwell of the feeder and said turntable being so synchronized with said feeder that it is adapted to receive bottles from said feeder during said dwell.

46. In a bottle filling machine, the combination with a turntable provided with bottle elevators and bottle filling means, of a bottle feeder for loading and unloading said turntable, said feeder comprising bottle propelling fingers structurally integral with hub means supporting said fingers for movement of a bottle in a path at least partially overlying the path of movement of the bottle elevators on said turntable, and means for so actuating said bottle feeder that the direction of the rotative movement of said fingers in moving said bottle over at least a portion of the path of movement of said bottle elevators is opposite to the rotative direction of movement of the bottle elevators on said turntable, said actuating means comprising intermittently operable driving connections provided with synchronized connections for the actuation of said turntable, whereby to provide a dwell of said actuating means during the movement of the bottles on said elevators out of engagement of said fingers.

47. In a bottle filler, the combination with a rotating turntable provided with bottle supports and bottle filling means, of a bottle positioning means carried above and to the rear of said supports and rotatable with said turntable, and a star wheel type bottle feeder including structurally integral arms adapted to engage bottles and to move the same toward the center of said turntable and across the path of movement of said supports to aline the bottles centrally with the path of movement of the central portion of the bottle supports, said positioning means and feeder having bottle engaging portions so disposed as to contact portions of a bottle on a line constituting a minor chord of said bottle offset from the center of the bottle in a direction opposite to the rotative direction of bottle movement on said supports when said bottle has been moved into said position in which it is centrally alined with the path of movement of the center of said supports.

48. In a bottle filler, the combination with a continuously rotating turntable provided with a bottle support and bottle filling means, of a positioning member associated with said support and carried above and to the rear of said support and rotatable with said turntable for engaging a bottle on said support and aiding in the placement of the bottle thereon, an intermittently operable bottle capping mechanism, and means synchronized with said continuously rotating turntable for unloading a bottle from said bottle support and intermittently positioning said bottle under said capper in capping position including an arm relatively movable across a portion of said turntable and across a portion of the path of movement of said support to engage said bottle on said support, the point of engagement of said bottle positioning mechanism and said arm with said bottle during the unloading operation being substantially restricted to points upon a minor chord thereof at the rear of the center of the bottle with reference to the path of ejection thereof from said support toward the capping position.

49. In a bottle filler, the combination with a continuously rotating turntable provided with a succession of bottle supports and means for filling bottles thereon, of a single intermittently rotating feeder for delivering empty bottles singly to said supports and for receiving filled bottles singly therefrom, guide means associated with the opposite sides of said feeder for coacting therewith in the delivery of bottles to and the receiving of bottles from said supports, and actuating connections for the synchronous actuation of said continuously rotating turntable and said intermittently rotating feeder, said feeder comprising successive pockets, each of which is fitted to and adapted to receive only a single bottle from said supports on said turntable immediately following the delivery of an empty bottle thereto and each support of said turntable being adapted to receive an empty bottle immediately upon discharge of a filled bottle to said feeder.

50. In a bottle handling machine, a bottle propelling member comprising a hub and fingers of non-metallic, yieldable material, a support for said member, mechanism having a driving boss for driving said member, and an eccentric aperture in said member for receiving said driving boss, said fingers having a concave front face relative to the direction of their normal rotation, whereby said concave face will constitute a substantial retaining element to retain bottles in a pocket intermediate said fingers and whereby, upon the application of pressure to the end of said fingers or to the opposite side thereof, said fingers will deflect toward said concave face thereby preventing easy entrance of bottles into said pocket.

51. In a device of the character described, the combination with a turntable having receptacle supports, of a receptacle positioning means rotatable with said turntable and carried above and to the rear of said supports, means for the continuous rotation of the turntable, a feed table adjacent the turntable, an intermittently rotatable star wheel having arms to engage bottles and move the same across the feed table and toward the turntable in the course of intermittent rotation of the star wheel, said arms so projecting from the star wheel as to provide receptacle propelling surfaces, which surfaces in given star wheel positions are substantially tangent to the path of movement of the receptacle when properly positioned on a turntable support, and means for intermittently rotatively advancing the star wheel, said means including mechanism for producing star wheel dwell in each of the aforesaid positions, whereby a receptacle advanced by the star wheel to a position adjacent said propelling surfaces may be readily moved along said surface of its respective propelling arm by the engagement of said receptacle by the receptacle positioning means carried above and to the rear of the bottle supports on said turntable.

52. A bottle filler comprising, in combination, a continuously rotatable turntable provided with a bottle filler and an intermittently vertically reciprocable bottle pedestal below said filler, means for continuously rotating said turntable, means for intermittently reciprocating said pedestal, a single intermittently rotatable star wheel feeder having structurally integral fingers, a drive shaft for said feeder, driving connections for said shaft including a Geneva wheel having peripherally opening slots inclined with reference to the radius of the wheel, and a co-acting drive pin means adapted for engagement with said slots, the inclination of said slots from the radius being adapted to prolong the dwell of the feeder and correspondingly accelerate its advancing movement between the periods of dwell.

53. A device of the class described comprising, in combination, a continuously rotatable turntable provided with bottle filling mechanism and vertically reciprocable bottle pedestals beneath said filling mechanism, an intermittently movable bottle feeder provided with structurally integral finger means for delivering successive bottles to said pedestals, means for the intermittent advance and dwell of said feeder, said finger means projecting from said feeder at an angle to be substantially tangent to the path of bottle movement on said pedestals during the dwell of said feeder, means for continuously rotating said turntable, means for intermittently reciprocating said pedestals, bottle positioning means for co-operating with said feeder for positioning the bottles on the pedestals, said last mentioned means comprising a member carried above and to the rear of said bottle pedestals for engagement with a bottle on said pedestals and rotatable with said turntable, a transfer support adjacent said turntable and in the path of movement of empty bottles when moved toward said support by said feeder, said transfer support being generally upwardly inclined in the direction of bottle movement at the position at which said bottles are propelled toward said pedestals by said feeder so that the discharge portion of said transfer support at said position in the path of the bottles is slightly higher than said pedestals when in bottle receiving position, and bottle guide means associated with said feeder and said transfer support and positioned along the path of movement of the bottles over said transfer support to be engaged by said bottles during the advance of the bottles in the course of transfer to said pedestals, whereby to co-act with said positioning means to centrally aline said bottles with said pedestals.

54. A bottle filling and capping device comprising, in combination, a continuously rotatable turntable provided with bottle elevators and bottle filling means, a continuously rotatable bottle feed, discharge and storage table, said bottle feed, discharge and storage table having a substantially smooth bottle engaging surface for the frictional advance of bottles thereover, means for continuously rotating said turntable and said bottle feed, discharge and storage table, transfer table means disposed between said turntable and said bottle feed, discharge and storage table, a bottle propelling member having structurally integral fingers provided with concave front faces relative to the direction of their normal rotation to constitute bottle retaining pockets, said fingers being rotatable in a path at least partially overlying the path of rotation of said elevators on said turntable, said bottle propelling member being adapted to receive empty bottles from said feed, discharge and storage table and deliver them to said bottle elevators on said turntable, guide means disposed above said transfer table means to facilitate the transfer of empty bottles from said bottle feed, discharge and storage table to said turntable and full bottles from said turntable back again to said bottle feed, discharge and storage table, bottle capping means disposed above the path of travel of full bottles from said turntable to said bottle feed, discharge and storage table, and stationary guide means fixed above said continuously rotatable bottle feed, discharge and storage table to maintain both empty and full bottles upon said bottle feed, discharge and storage table and to separate the full bottles from the empty bottles and to guide the empty bottles toward the bottle receiving pockets in said bottle propelling member, whereby a portion of the area of the bottle feed, discharge and storage table is available for the storage of filled and capped bottles and another portion of said bottle feed, discharge and storage table is available for receiving empty bottles and feeding the same toward said bottle propelling member.

ADOLPH J. LIPPOLD.